Aug. 3, 1965    M. BALLESTRA    3,198,849
METHOD AND APPARATUS FOR EFFECTING SULFONATION
Filed Sept. 22, 1960
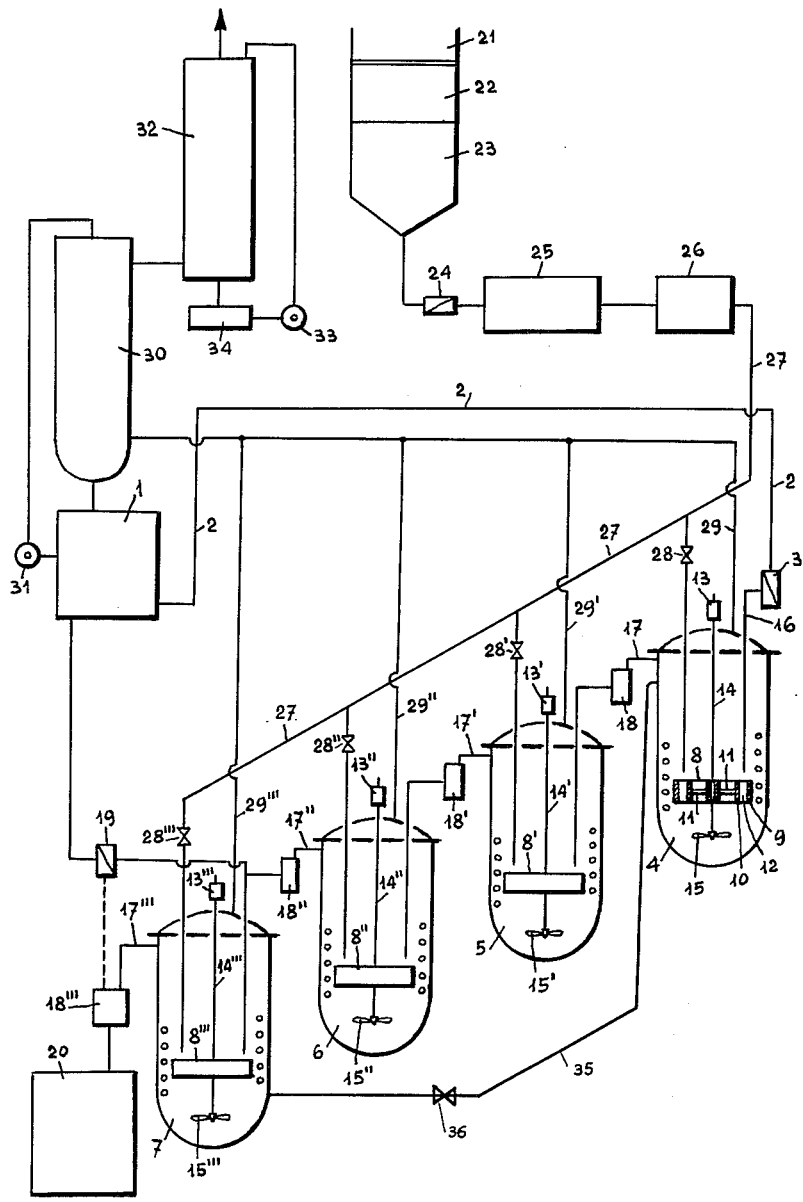
INVENTOR
MARIO BALLESTRA
By
HIS ATTORNEY United States Patent Office 3,198,849
Patented Aug. 3, 1965

3,198,849
METHOD AND APPARATUS FOR EFFECTING SULFONATION
Mario Ballestra, Via Pertinace 2/4, Genoa, Italy
Filed Sept. 22, 1960, Ser. No. 57,755
Claims priority, application Italy, July 4, 1960, 636,961
9 Claims. (Cl. 260—686)

It is well known that in order to accomplish a chemical reaction between a considerable amount of liquid compound and a reagent, either liquid or gaseous, large reactors-mixers are required and the reaction cannot always be accomplished in a complete manner and in a short time.

The object of the present invention relates to an improved reaction process and an apparatus which is very simple, not expensive and very efficient.

The method of the invention which accomplishes in a continuous manner the reaction between a considerable amount of a liquid compound to be treated and a liquid or gaseous reagent is characterized by the steps comprising metering of the liquid or gaseous reagent in proper portions among the various reaction containers through parallel circuits connected for the insertion of the said reagent and supplying to a series circuit through each reaction container a properly proportioned and metered amount of the material to be treated.

The above method is also characterized in that the reaction takes place in several successive reaction containers, the first of which is fed in a continuous manner with a metered amount of the liquid compound to be treated, said metered amount of the liquid being proportioned with respect to the total proportion of the reagent supplied. The amount of liquid supplied to the first container is adjusted by the reagent. The metered amount of liquid which has partially reacted, goes on to a second reaction container which is fed with another and independent portion of reagent, said new portion causing the reaction to proceed further. The liquid which has so reacted in the second container goes on to a third reaction container and reacts similar to the first two, and so on in this series circuit until the last reaction container where the reaction is completed.

The liquid compound to be treated is fed by one or more additional metering devices each of them being controlled by an apparatus determining the reaction degree in the last or in the single reactor-mixers, so that the final product of the reaction is completely free from unutilized reagent and untreated liquid compound.

The portion of reagent introduced per unit of time into the first reaction contained is stoichiometrically not sufficient with respect to the amount of liquid compound to be treated which is introduced per unit of time into the first reaction container. The portions of reagent introduced into any other reaction container are proportioned and controlled in such a way that each portion supplied is the most suitable with respect to the next proceeding reaction and each reaction which has occurred within each of the preceding reaction containers, and also with respect to the amount of compound to be treated which has not yet reacted before reaching said reaction container.

The installation for embodying the above process is characterized in that it comprises:

A series of reactors or mixers, provided with dispersing stirring and overflow devices, placed in a concatenate arrangement through which the compound to be treated passes and is stirred, and into which is supplied a controllable portion of reagent, sufficient to cause in every reactor-mixer the reaction of only part of the compound. On the whole the reagent is proportioned in a small excess to cause, in each unity of time, the reaction of a considerable amount of the compound previously proportioned per unit of time.

One or more devices is employed for the continuous control of the degree of reaction, each of them actuating an additional proportioning device for the liquid compound to be treated. Devices are employed for collecting, conveying and eventually treating the gases which may develop from the reaction and/or may be contained in the reagent as diluents. An embodiment of the present invention relating to a sulfonation process with sulphuric anyhydride from a gas of catalytic conversion is illustrated schematically and by way of example on the annexed drawing.

With reference to the figure: 1 denotes the container for the material to be treated. The reference numeral 2 is the feeding pipe which conveys the material to be treated to the metering or proportioning pump 3, 4, 5, 6 and 7 are reactors-mixers of known types, with a serial and concatenate connection between each other in the series order named. 8, 8', 8" and 8"' are the dispersing devices in the reactors and in this case a double annular band 9 and 10 is supported by inclined radial elements 11 and bearing inclined blades 12. Said dispersing devices are driven by electric motors 13, 13', 13" and 13"' through the shafts 14, 14', 14" and 14"' which project to the underside of the dispersing devices and each is provided with the downwardly stirring device 15, 15', 15" and 15"'. The reference numeral 16 is the piping feeding the first reactor-mixer 4 with material to be treated, previously metered or proportioned by pump 3. The reference numeral 17 is an overflow pipe for the outlet of the material which has partially reacted in the first reactor-mixer 4 and which is sent into the second reactor-mixer 5. Apparatus 18 located on pipe 17 is a device for determining the degree of reaction having taken place in the preceding reactor-container. 17', 17", 17"' are overflow pipes for the outlet of the material which has reacted in the successive reactors-mixers, wtih a serial and concatenate connection to the reactor containers 5, 6, 7. Devices 18', 18", and 18"' are for determining the degree of reaction having taken place in the preceding reactor container and are placed respectively on the overflow pipes 17', 17", 17"' coming out respectively from reactors-mixers 5, 6, 7. The device 18"', besides regulating the degree of total reaction of the treated material, controls a second metering and proportioning correction pump 19 which eventually sends material to be treated into the last reactor-mixer 7, to properly proportion the ingredients and correct the reaction degree therein. The reference numeral 20 is the tank for recovering the final product. The reference numeral 21 is a hopper containing powdered sulphur above a zone 22 within which occurs the melting of sulphur which passes to a hopper 23 containing the melted sulphur under a thermostat control. The reference numeral 24 is a metering or proportioning pump for feeding the melted sulphur to the combustion chamber 25 within which the measured sulphur burns and is passed to the catalysis chamber 26 within which the sulphurous anhydride is changed almost completely into sulphuric anhydride or from which the gas of catalytic conversion, practically proportioned, is fed through piping 27 and is parted or separated, with a distribution in parallel, simultaneously into each of the several reactors-mixers 4, 5, 6 and 7 through the regulating valves 28, 28', 28" and 28"' which proportion the proper amount of gaseous reagent. Exhaust pipes 29, 29', 29", and 29" are for the discharge of the gases, which have not taken part in the reaction, from the upper portion of the reactors-mixers, and to convoy them together into the lower portion of a recovering tower 30. The sulphuric anhydride going upwards in the tower meets, in counter-current, a portion of the material to be treated conveyed into the upper portion of the tower, by means of the metering pump 31 which sucks it from container 1, and reacts with it in the chamber 30. The portion of gas which has not reacted with the material to be treated in the tower is passed from the exit from the top of tower 30 and is introduced from below into the lower end of a recovering tower 32 similar to the previous tower. The sulphurous anhydride going up within the tower 32, meets, in counter-current, an alkaline solution sent into the upper portion on the tower 32, by means of a metering pump 33 which sucks the said solution from a container 34 and causes the production of a recovering compound.

The structure operates as follows: the material to be treated, such as an alkylated hydrocarbon, a phenol, or an aliphatic acid or alcohol, or the like, is taken from a container 1 and, by means of a metering or proportioning pump 3 and is sent through a series of reactors-mixers, within which the proportioned material to be treated is mixed together with a portion to reagent, so as only a predetermined portion of material reacts. If at the outlet of the last reactor-mixer 7 of the series, the sulphonation control should perceive or detect an excess of reagent, automatically the apparatus determining the reaction degree functions to readjust the metering and proportioning pump 19, to feed the proper or correlated amount of material to be treated that may eventually be needed at this or other stages of the series The devices 18, 18', 18" may eventually actuate an additional amount of raw material to be treated in each of the single reactors-mixers as required by the apparatus 18'''.

The reagent, like sulphuric anhydride, is prepared starting from powdered sulphur which is melted and proportioned at the liquid state, is then oxidized and by a catalyst is converted into sulphuric anhydride to be proportioned among the several reactors-mixers, so as to obtain a gradual and continuous reaction. There are provided exhaust pipes for gaseous reagents and two recovering towers 30 and 32 in case the reagent is a sulphur compound; in the first tower sulphuric anhydride is recovered and in the second one the sulphurous anhydride.

The present invention has been described and illustrated with reference to the accompanying drawing, based on a given reagent; many modifications and changes may be made in embodying the invention, according to the reagents used and in order to arrange the necessary proportions as required in each case according to the applications for which it is used. For example by connecting the lower part of the lower mixer 7 to the upper part of the first mixer 4 by means of a recycling conduit 35 provided with interception central means 36 one may utilize said recycling during the starting time of the installation, until a product corresponding to the desired characteristics is obtained. When the installation does not work continuously and regularly the metered proportions must be regulated and all these modifications and changes, howver, are based on the main ideas of the invention to obtain a continuously operating system, as summarized in the following claims.

What I claim is:

1. A method for carrying out a continuous exothermic sulphonation reaction between a liquid compound to be treated and gaseous sulphur trioxide, in a plurality of reaction containers, connected in series in a cascade arrangement to produce a sulphonic acid which comprises the steps of continuously measuring and supplying a measured and predetermined amount of sulphur trioxide, dividing the continuously supplied sulphur trioxide into a series of predetermined portions, feeding each sulphus trioxide portion directly to each reaction container, continuously measuring and supplying a measured and predetermined amount of said liquid compound to the first reaction container of the series for passage seriatim through the series, and proportioning the supply of each of said sulphur trioxide portions with the amount of said continuously supplied liquid compound to produce a predetermined sulphonation reaction in each container between said liquid compound and less than the stoichiometric quantity of sulphur trioxide, resulting in a totally reacted product in the last reaction container at the end of the series between stoichiometric quantities of said liquid compound and said sulphur trioxide.

2. A method for carrying out a continuous exothermic sulphonation reaction between a liquid compound to be treated selected from the group consisting of alkylated hydrocarbon, phenol, aliphatic acid, and aliphatic alcohol, and gaseous sulphur trioxide, in a plurality of reaction containers, connected in series in a cascade arrangement to produce a sulphonic acid which comprises the steps of continuously measuring and supplying a measured and predetermined amount of sulphur trioxide, dividing the continuously supplied sulphur trioxide into a series of predetermined portions, feeding each sulphur trioxide portion directly to each reaction container continuously measuring and supplying a measured and predetermined amount of said liquid compound to the first reaction container of the series for passage seriatim through the series, proportioning the supply of each of said sulphur trioxide portions with the amount of said continuously supplied liquid compound to produce a predetermined sulphonation reaction in each container between said liquid compound and less than the stoichiometric quantity of sulphur trioxide, resulting in a totally reacted product in the last reaction container at the end of the series between stoichiometric quantities of said liquid compound and said sulphur trioxide.

3. A reactor apparatus for carrying out an exothermic sulfonation reaction between a liquid compound and sulphur trioxide consisting of a plurality of reactor containers disposed in a cascade arrangement and comprising a first reactor container, a last reactor container, and at least one intermediate reactor container, a plurality of lines connecting adjacent reactor containers in series, a line to supply the liquid compound to be treated to the first reactor container, a source of said sulphur trioxide, means to simultaneously supply each reactor container with a predetermined amount of said sulphur trioxide from said source, metering means to control the amount of each portion of gaseous sulphur trioxide supplied to each reactor container for each unit of time, means to meter the supply of the liquid compound to be treated to the first reactor container in proportion to the total amount of sulphur trioxide supplied to effect incomplete reaction of said liquid compound with less than the stoichiometric quantity of said sulphur trioxide in said first reactor container and in each intermediate reactor container, said sulphonation reaction being completed in said last reactor container, a final product tank, means to feed the sulphur trioxide from each reactor container to the next succeeding container of the series and to the final product tank, conduit means connecting the interior of said last container with the interior of said first container, and pump means in said conduit for controlled transfer of fluid.

4. The apparatus defined in claim 3 further comprising means for controlling the portions of the gaseous reagent to each container, said feeding means controlling said last mentioned means.

5. The apparatus defined in claim 3 further comprising a metering means for supplying a predetermined amount of the liquid compound to be treated to the feeding means supplying the end product from the last container of the series of reactor cotnainers to said final product tank.

6. The apparatus defined in claim 3 further comprising a metering means for supplying a predetermined proportion of the liquid compound to be treated to the last reactor container of the series.

7. The apparatus defined in claim 3 further comprising a recovery tower, a connecting line from each reactor to said recovery tower, means to deliver a predetermined amount of said liquid compound to be treated to the top of said recovery tower and a second outlet from said recovery tower to a source of liquid compound to be treated.

8. The apparatus defined in claim 3 further comprising a second recovery tower being connected adajacent the lower end of the second recovery tower, a container connected to the lower end of the second recovery tower end pump means to circulate recovery compound from said container ot the top of said second recovery tower and discharge in the top of said second recovery tower.

9. A reactor apparatus for carrying out an exothermic sulfonation reaction between a liquid compound and gaseous sulphur trioxide consisting of plurality of reactor containers disposed in a cascade arrangement and comprising a first reactor container, a last reactor container, and at least one intermediate reactor container, a plurality of lines connecting adjacent reactor containers in series, a line to supply the liquid compound to be treated to the first reactor container, a source of said sulphur trioxide, means to simultaneously supply each reactor container with a predetermined portion of said gaseous reagent from said source, metering means to control the amount of each portion of sulphur trioxide supplied to each reactor container for each unit of time, means to meter the supply of the liquid compound to be treated to the first reactor container in proportion to the total amount of said sulphur trioxide supplied to effect incomplete reaction of said liquid compound with less than the stoichiometric quantity of said sulphur trioxide in said first reactor container and in each intermediate reactor container, said sulphonation reaction being completed in said last reactor container, a final product tank, means to feed the reagent from each reactor container to the next succeeding container of the series and to the final product tank, conduit means connecting the interior of said last container with the interior of said first container, pump means in said conduit for controlled transfer of fluid from said last container to said first container, means for controlling the portions of said sulphur trioxide to each container said feeding means controlling said last mentioned means, a metering means for supplying a predetermined amount of the liquid compound to be treated to the feeding means supplying the end product from the last container of the series of reactor containers to said final product tank, a metering means for supplying a predetermined proportion of the liquid compound to be treated to the feeding means supplying the end product from the last container of the series of reactor containers to said final product tank, a metering means for supplying a predetermined proportion of the liquid compound to be treated to the last reactor container of the series, a recovery tower, a connecting line from each reactor to said recovery tower, means to deliver a predetermined amount of said liquid compound to be treated to the top of said recovery tower, an outlet adjacent the top of said recovery tower and a second outlet from said recovery tower to a source of liquid compound to be treated, a second recovery tower, said oulet adjacent the upper end of the first recovery tower being connected adjacent the lower end of second recovery tower, a container connected to the lower end of the second recovery tower and pump means to circulate recovery compound from said container to the top of said second recovery tower and a discharge in the top of said second recovery tower.

References Cited by the Examiner

UNITED STATES PATENTS

| | | | |
|---|---|---|---|
| 81,496 | 8/68 | Gwynn et al. | 23—260 |
| 308,083 | 11/84 | Maguin | 23—65 X |
| 1,198,519 | 9/16 | Bradley. | |
| 1,943,786 | 1/34 | Cowles | 23—1 X |
| 2,527,340 | 10/50 | Taylor | 23—65 |
| 2,664,341 | 12/53 | Kesting | 23—260 |
| 2,683,079 | 7/54 | Booth | 23—152 X |
| 2,787,521 | 4/57 | Roberts et al. | 23—65 |
| 2,978,441 | 4/61 | Sherk | 23—260 X |

FOREIGN PATENTS

| | | |
|---|---|---|
| 27,867 | 4/13 | Great Britain. |

MAURICE A. BRINDISI, *Primary Examiner.*